J. F. BRENNAN.
TIRE CARRIER.
APPLICATION FILED JUNE 5, 1920.
1,366,240.  Patented Jan. 18, 1921.
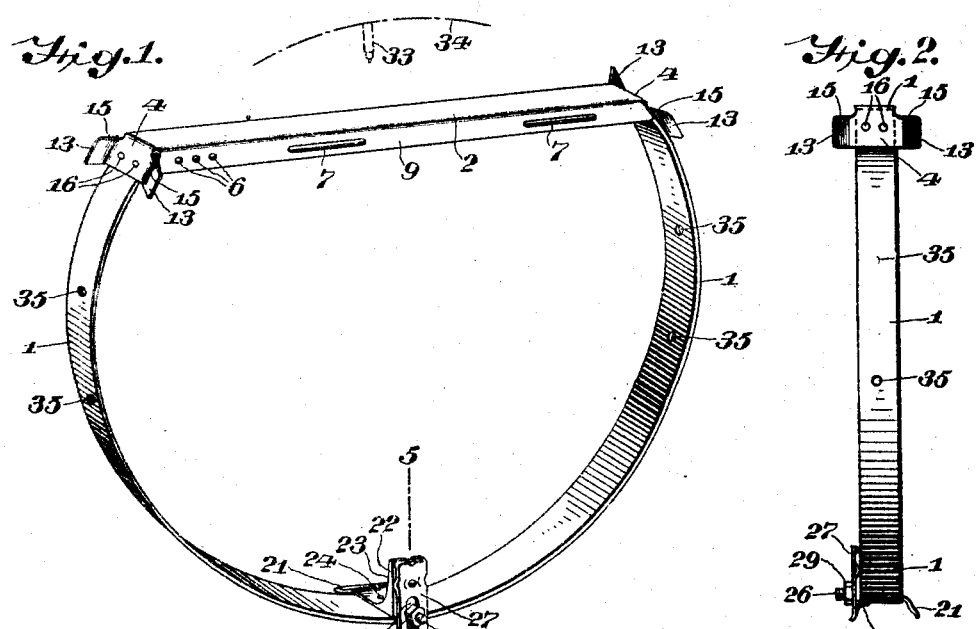
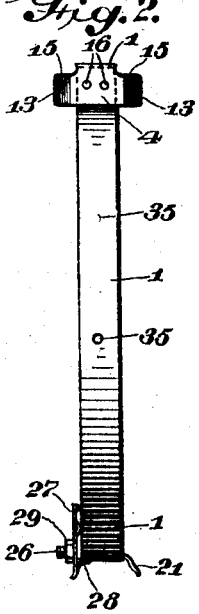
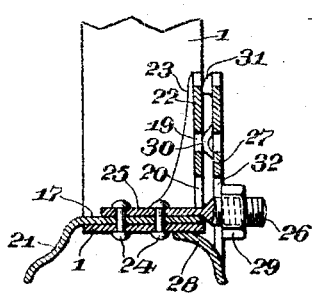
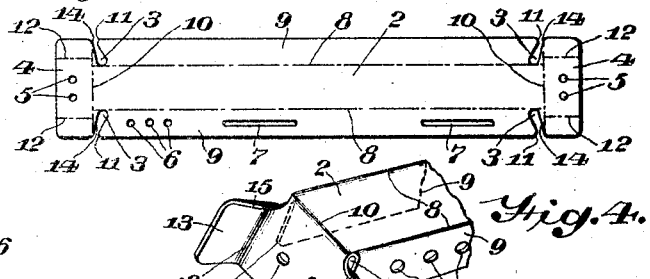
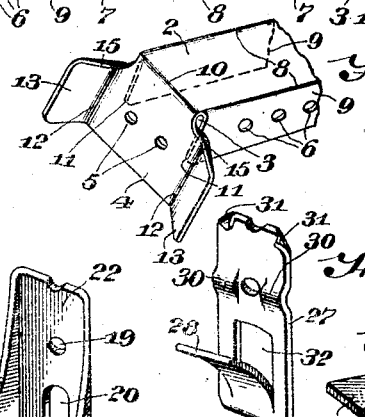
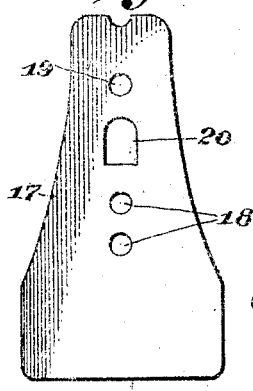
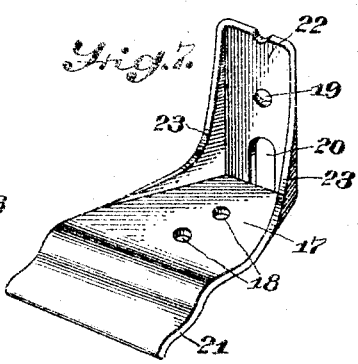
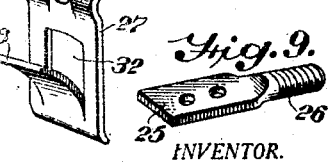
INVENTOR.
John F. Brennan
BY
Cornelius L. Ehret
his ATTORNEY.

UNITED STATES PATENT OFFICE.

JOHN F. BRENNAN, OF WILLIAMSPORT, PENNSYLVANIA.

TIRE-CARRIER.

1,366,240.　　　　　Specification of Letters Patent.　　Patented Jan. 18, 1921.

Application filed June 5, 1920. Serial No. 386,686.

*To all whom it may concern:*

Be it known that I, JOHN F. BRENNAN, a citizen of the United States, residing in Williamsport, county of Lycoming, State of Pennsylvania, have invented certain new and useful Improvements in Tire-Carriers, of which the following is a specification.

My invention relates to tire racks or carriers for supporting or carrying tires, tire rims, or rims having mounted thereon tires, such as pneumatic tires employed upon motor vehicles.

It is the object of my invention to provide a structure which shall be exceedingly simple, and of low cost of manufacture, and yet sturdy and rugged, with features permitting quick attachment and detachment of rims or tires.

To these ends I have devised structure of the character hereinafter described and in part characterized by the employment of a substantially circular base ring of greater than a half circumference and less than a whole circumference, whose ends are attached to a chord beam or bar integral with which are rim seats or lugs, the beam or bar and the lugs or seats being preferably formed of a single piece of sheet metal.

My invention resides in structure of the character hereinafter described and claimed.

For an illustration of one of many forms my invention may take, reference is to be had to the accompanying drawing, in which:

Figure 1 is a perspective view of a tire carrier embodying my invention.

Fig. 2 is a side elevational view of the same.

Fig. 3 is a plan view of the sheet prepared for formation into the chord bar or beam.

Fig. 4 is a fragmentary view, in perspective, of one end of the chord beam with the attached rim seat structure.

Fig. 5 is a fragmentary sectional view, on enlarged scale, on the line 5—5 of Fig. 1.

Fig. 6 is a plan view of a sheet prepared for formation into the member shown in Fig. 7.

Fig. 7 is a perspective view of one of the members of the clamping structure.

Fig. 8 is a perspective view of another member of the clamping structure.

Fig. 9 is a perspective view of the clamping bolt.

Referring to the drawing, 1 is a base member which may be of any suitable form, as for example, circular, as illustrated, and may be made of any suitable material, as strip or sheet metal, as steel, of any suitable character, as for example, springy or resilient steel having suitable amount of carbon content for such purpose. The strip 1 is preferably simple or plain, as illustrated, without marginal or edge upturn or flange.

In extent the member 1 is greater than a half circumference and less than a full circumference, its ends being joined by the chord beam or bar 2, of any suitable material, as mild or annealed steel.

The member 2 may be formed from a plain flat strip or sheet, as indicated in Fig. 3. The flat sheet or strip has cut in the sides thereof adjacent each end the notches 3, leaving the end portions 4 integral with the body of the strip. In the end portions 4 may be punched or drilled rivet holes 5; and along one side of the body of the strip may be drilled or punched holes 6 and the elongated slots 7, the holes 6 affording means for attaching a tail light of an automobile, while the slots 7 afford means for attaching a license tag.

The strip 2 may then be bent along the lines 8, 8 in a die or by any other suitable method or means, to form the strip into a channel having the web 2 and the flanges 9, whereby the strip is formed into a channel beam or bar. The seat members 4 are bent along the lines 10, 10, in a die or by any other suitable means or method, to extend downwardly from the web 2 at an angle, as indicated in Figs. 1 and 4. The tips 11 of the flanges 9 serve as back stops, if desired, for the seat members 4, which, or the member 1 secured thereto, may rest against the tips 11. The members 4 are bent along the lines 12, as in a die or by any other suitable device or method, to form the upstanding rim-engaging ears or lugs 13. And the inner edges of the seat members 4, along or adjacent the edges 14 of the slots 3, are upturned, by die or by other suitable device or method, as indicated at 15, Fig. 4, to form strengthening flanges for rendering the seat members more rigid and resistant to bending.

There is thus formed from a simple plain strip or sheet of metal a chord or transverse bar or beam of channel section, integral with which are rim seats having integral rim-engaging lugs and reinforcing flanges.

The ends of the base or support member 1 are provided with holes adapted to register with the holes 5 in the rim seats 4, the ends of the member 1 extending under the seats 4 between the same and the flanges 9 of the beam member 2, rivets 16 extending through the holes in the member 1 and through the holes 5 of the seats 4, rigidly securing the members 1 and 4 to each other, and by this means securing the chord bar or beam to the base or support 1.

At any suitable place upon the member 1, preferably at its bottom mid-way between the seat members 4, is attached any suitable means for forming a third rim seat.

In the example illustrated, this third rim seat consists of a sheet metal member 17, Fig. 6, formed by die or by any other suitable device or method into the form indicated in Fig. 7, the holes 18 and 19 and the slot 20 preferably being formed therein before forming into the shape indicated in Fig. 7. As shown, the member 17 has formed integral therewith a rim-engaging lug 21 and the upstanding portion 22, between which and the horizontal portion 17 are formed the stiffening flanges 23.

As shown in Fig. 5, the member 17 fits against the inner side of the member 1 and is secured thereto by rivets 24. The same rivets 24 may secure to the member 17 the flat portion 25 of the screw threaded bolt 26, Fig. 9. Or the flat portion 25 may be first welded to the member 17, the bolt 26 being in position indicated extending through the slot 20 of member 17, and thereafter the members 25 and 17 punched or drilled to form holes for the rivets 24.

Co-acting with the members 17 and 1 is the clamping member 27, forming therewith a structure for clamping or holding a rim between the rim lug 21 and the lug 28, Figs. 5 and 8, struck up from the sheet of metal forming the member 27. The clamping member 27 is drawn toward the left, Fig. 5, by the nut 29 threaded upon the bolt 26, the member 27 having the projections or lugs 30 and 31 engaging the upstanding portion 22 of the member 17, the bolt 26 extending through the opening 32 in the member 27 and the nut 29 engaging the outer face of the member 27 to either side of the opening 32.

To place a rim upon the rack or carrier, the nut 29 is removed, together with the member 27, the upper part of the rim placed in register with the rim seats 4 whose lugs 13 engage the upturned flanges of the rim, the lower side of the rim being then pushed inwardly from the member 1 until a flange of the rim engages the lower rim-engaging lug 21. The member 27 is then placed in position and forced toward the left, Fig. 5, by rotating nut 29 upon the bolt 26, bringing the co-acting rim-engaging lug 28 into engagement with the other rim flange, thereby securely holding the rim in place upon the three rim seats, two of which are 4, 4 and the third of which comprises the lugs 21 and 28, the latter removable.

When the rim is carrying a tire, the rim and tire are brought into such relation with the carrier or rack that the valve stem, indicated at 33, in dotted lines, in Fig. 1, is in the free space above the beam or bar 2, the inner outline of the rim being indicated in dotted lines at 34.

The carrier or rack may be supported upon an automobile or other suitable structure by brackets, not shown, which may be attached to the base or support 1 by rivets passing through the brackets and the holes 35 in the member 1.

By the structure above described, great simplicity, low cost of manufacture and perfectly rugged and serviceable structure are obtained.

What I claim is:

1. A rim or tire carrier comprising a transversely extending bar, rim seats integral with said bar at opposite ends thereof, a support having ends secured respectively adjacent the ends of said bar structure, and a third rim seat intermediate said first named rim seats comprising a rim-engaging lug secured to said support, a co-acting rim-engaging lug, and means for forcing said last named lug to rim-engaging position.

2. A rim or tire carrier comprising a transversely extending bar, rim seats integral with said bar at opposite ends thereof, rim-engaging lugs integral with said rim seats, a support having ends secured respectively to said bar structure adjacent said rim seats, and a third rim seat intermediate said first named rim seats comprising a rim-engaging lug secured to said support, a co-acting rim-engaging lug, and means for forcing said last named lug to rim-engaging position.

3. A rim or tire carrier comprising a transversely extending bar, rim seats integral with said bar at opposite ends thereof, a support having ends secured to said bar structure and disposed respectively between said rim seats and the ends of said bar, and a third rim seat intermediate said first named rim seats comprising a rim-engaging lug secured to said support, a co-acting rim-engaging lug, and means for forcing said last named lug to rim-engaging position.

4. A rim or tire carrier comprising a transversely extending bar having a downwardly extending flange, rim seats integral with said bar at opposite ends thereof and backed by the ends of said flange, a support having ends secured to said rim seats, and rim-engaging and holding means carried by said support between said rim seats.

5. A rim or tire carrier comprising a support, a transversely extending bar structure secured to the ends of said support, said bar structure comprising a body portion, rim seats integral therewith at the ends of said body portion, said rim seats having upturned rim-engaging lugs, and integral flanges strengthening said lugs and seats.

6. A rim or tire carrier comprising a ring-shaped support having extent greater than a half circle and less than a whole circle, and a chord beam to whose ends the ends of said support are secured, said beam comprising a web and a flange, and rim seats integral therewith.

7. A rim or tire carrier comprising a ring-shaped support having extent greater than a half circle and less than a whole circle, and a chord beam to whose ends the ends of said support are secured, said beam comprising a web and a flange, and rim seats integral therewith, the ends of said support disposed between the ends of said flange and said rim seats.

8. A rim or tire carrier comprising a ring-shaped support having extent greater than a half circle and less than a whole circle, and a chord beam to whose ends the ends of said support are secured, said beam comprising a web and a flange, and rim seats integral therewith, said flange having attachment apertures.

9. A rim or tire carrier comprising a ring-shaped support having an extent greater than a half circle and less than a whole circle, a chord beam having a web and flanges forming a channel section, and rim seats integral with the web at opposite ends thereof.

10. A rim or tire carrier comprising a ring-shaped support having an extent greater than a half circle and less than a whole circle, a chord beam having a web and flanges forming a channel section, and rim seats integral with the web at opposite ends thereof, said rim seats having upturned rim-engaging lugs, the ends of said support secured to said rim seats.

11. A rim or tire carrier comprising a ring-shaped support having an extent greater than a half circle and less than a whole circle, a chord beam having a web and flanges forming a channel section, and rim seats integral with the web at opposite ends thereof, said rim seats having upturned rim-engaging lugs, the ends of said support secured to said rim seats between said seats and said beam.

In testimony whereof I have hereunto affixed my signature this 1st day of June, 1920.

JOHN F. BRENNAN.